(12) United States Patent
Shiota

(10) Patent No.: US 9,942,408 B2
(45) Date of Patent: Apr. 10, 2018

(54) CONFERENCE MANAGEMENT SYSTEM, CONFERENCE MANAGEMENT DEVICE, WIRELESS TERMINAL, CONFERENCE MANAGEMENT METHOD, AND CONFERENCE MANAGEMENT PROGRAM

(71) Applicant: NEC Platforms, Ltd., Kawasaki-shi, Kanagawa (JP)

(72) Inventor: Shinsuke Shiota, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 15/505,854

(22) PCT Filed: Sep. 29, 2016

(86) PCT No.: PCT/JP2016/078900
§ 371 (c)(1),
(2) Date: Feb. 22, 2017

(87) PCT Pub. No.: WO2017/068927
PCT Pub. Date: Apr. 27, 2017

(65) Prior Publication Data
US 2017/0272578 A1 Sep. 21, 2017

(30) Foreign Application Priority Data

Oct. 21, 2015 (JP) .................................. 2015-206845

(51) Int. Cl.
*H04M 3/56* (2006.01)
*H04W 84/12* (2009.01)
(Continued)

(52) U.S. Cl.
CPC ...... *H04M 3/56* (2013.01); *H04M 2203/5009* (2013.01); *H04M 2207/18* (2013.01);
(Continued)

(58) Field of Classification Search
CPC ....... H04W 4/06; H04W 48/16; H04W 84/12; H04W 88/02; H04W 88/08; H04M 3/56; H04M 2203/5009; H04M 2207/18
See application file for complete search history.

(56) References Cited

U.S. PATENT DOCUMENTS

| | | | | |
|---|---|---|---|---|
| 6,573,926 B1 * | 6/2003 | Ichimura | .................. | H04N 7/15 348/14.08 |
| 2003/0144004 A1 * | 7/2003 | Canova, Jr. | ........... | H04M 3/567 455/453 |

(Continued)

FOREIGN PATENT DOCUMENTS

| | | |
|---|---|---|
| CN | 102340792 A | 2/2012 |
| CN | 102893573 A | 1/2013 |

(Continued)

OTHER PUBLICATIONS

Notice of Allowance in corresponding JP 2015-206845, dated Nov. 22, 2016.

(Continued)

*Primary Examiner* — Tri H Phan
(74) *Attorney, Agent, or Firm* — Sughrue Mion, PLLC

(57) ABSTRACT

A conference management system of the present invention displays, before terminals used by users participate in a conference, electric field intensity information of the respective terminals, and available capacity information of bands in a plurality of lines, for each of the respective terminals and enables the users to select one terminal from among the plurality of terminals based on the display. Provided is the conference management system including a conference management device connected to a plurality of networks and a plurality of wireless terminals connected to the conference management device via access points corresponding to the plurality of networks. One or more wireless terminals corresponding to a predetermined user name display a plurality (Continued)

of wireless terminal names corresponding to the predetermined user name, and electric field intensity information and band information of access points to which the respective terminals belong, which have been received from the conference management device.

8 Claims, 15 Drawing Sheets

(51) Int. Cl.
*H04W 88/08* (2009.01)
*H04W 88/02* (2009.01)

(52) U.S. Cl.
CPC ............ *H04W 84/12* (2013.01); *H04W 88/02* (2013.01); *H04W 88/08* (2013.01)

(56) References Cited

U.S. PATENT DOCUMENTS

| | | | |
|---|---|---|---|
| 2005/0021777 A1* | 1/2005 | Nakao | ..................... H04L 67/14 709/228 |
| 2006/0126539 A1* | 6/2006 | Hollins | ............. H04L 29/06027 370/260 |
| 2009/0245497 A1* | 10/2009 | Ruetschi | ............. H04L 12/1818 379/202.01 |
| 2015/0350260 A1* | 12/2015 | Tadepalli | .............. H04L 65/403 709/203 |
| 2016/0112469 A1* | 4/2016 | Liu | ..................... H04L 65/4046 348/14.03 |

FOREIGN PATENT DOCUMENTS

| | | |
|---|---|---|
| CN | 103179641 A | 6/2013 |
| CN | 103581300 A | 2/2014 |
| JP | 2002-218522 A | 8/2002 |
| JP | 2004-159258 A | 6/2004 |
| JP | 2006-222831 A | 8/2006 |
| JP | 2012-205085 A | 10/2012 |
| JP | 2015-2431 A | 1/2015 |

OTHER PUBLICATIONS

International Search Report for PCT/JP2016/078900, dated Nov. 29, 2016.

Communication dated Jan. 2, 2018, from State Intellectual Property Office of the P.R.C. in counterpart application No. 201680002604.7.

\* cited by examiner

ELECTRIC FIELD INTENSITY & BAND INFORMATION TABLE

| No | TERMINAL | ELECTRIC FIELD INTENSITY | AVAILABLE CAPACITY OF BAND IN CHANNEL |
|---|---|---|---|
| 1 | WIRELESS TERMINAL 401-1 | 90% | 0kbps |
| 2 | WIRELESS TERMINAL 401-3 | 80% | 500kbps |

Fig. 5A

ELECTRIC FIELD INTENSITY & BAND INFORMATION TABLE

| No | TERMINAL | ELECTRIC FIELD INTENSITY | AVAILABLE CAPACITY OF BAND IN CHANNEL |
|---|---|---|---|
| 1 | WIRELESS TERMINAL 401-1 | 80% | 100kbps |
| 2 | WIRELESS TERMINAL 401-3 | 90% | 500kbps |

Fig. 5B

ELECTRIC FIELD INTENSITY & BAND INFORMATION TABLE

| No | TERMINAL | ELECTRIC FIELD INTENSITY | AVAILABLE CAPACITY OF BAND IN CHANNEL |
|---|---|---|---|
| 1 | WIRELESS TERMINAL 401-1 | 90% | 500kbps |
| 2 | WIRELESS TERMINAL 401-3 | 80% | 100kbps |

Fig. 5C

ELECTRIC FIELD INTENSITY & BAND INFORMATION TABLE

| No | TERMINAL | ELECTRIC FIELD INTENSITY | AVAILABLE CAPACITY OF BAND IN CHANNEL |
|---|---|---|---|
| 1 | WIRELESS TERMINAL 401-1 | 80% | 500kbps |
| 2 | WIRELESS TERMINAL 401-3 | 90% | 100kbps |

Fig. 5D

LOGIN INFORMATION TABLE

| No | USER | TERMINAL |
|---|---|---|
| 1 | USER A | WIRELESS TERMINAL 401-1 |
| 2 | USER A | WIRELESS TERMINAL 401-3 |
| 3 | USER B | WIRELESS TERMINAL 401-2 |

Fig. 7

ACCESS POINT BAND INFORMATION TABLE

| ACCESS POINT IDENTIFICATION INFORMATION | BAND IN CHANNEL IN USE | MAXIMUM CAPACITY OF BAND IN CHANNEL |
|---|---|---|
| WIRELESS LAN ACCESS POINT 201 | 600kbps | 600kbps |

Fig. 8A

ACCESS POINT BAND INFORMATION TABLE

| ACCESS POINT IDENTIFICATION INFORMATION | BAND IN CHANNEL IN USE | MAXIMUM CAPACITY OF BAND IN CHANNEL |
|---|---:|---:|
| 3G ACCESS POINT 301 | 100kbps | 600kbps |

Fig. 8B

TERMINAL SPEECH QUALITY INFORMATION TABLE

| No | USER | TERMINAL | ELECTRIC FIELD INTENSITY | BAND IN CHANNEL IN USE | MAXIMUM CAPACITY OF BAND IN CHANNEL |
|---|---|---|---|---|---|
| 1 | USER A | WIRELESS TERMINAL 401-1 | 90% | 600kbps | 600kbps |
| 2 | USER A | WIRELESS TERMINAL 401-3 | 80% | 100kbps | 600kbps |
| 3 | USER B | WIRELESS TERMINAL 401-2 | 80% | 600kbps | 600kbps |

Fig. 9

CONFERENCE MANAGEMENT SYSTEM, CONFERENCE MANAGEMENT DEVICE, WIRELESS TERMINAL, CONFERENCE MANAGEMENT METHOD, AND CONFERENCE MANAGEMENT PROGRAM

CROSS REFERENCE TO RELATED APPLICATIONS

This is a National Stage of International Application No. PCT/JP2016/078900 filed Sep. 29, 2016, claiming priority based on Japanese Patent Application No. 2015-206845 filed Oct. 21, 2015, the contents of all of which are incorporated herein by reference in their entirety.

TECHNICAL FIELD

The present invention relates to a conference management system, a conference management device, a wireless terminal, a conference management method, and a program for conference management and, in particular, to a conference management system, a conference management device, a wireless terminal, a conference management method, and a program for conference management for managing telephone conferences.

BACKGROUND ART

When a participant(s) takes part in a telephone conference using a terminal(s), for example, a line such as a wireless LAN network standardized by IEEE 802.11 and a best effort IP network including 3G (3rd Generation mobile communication system) may be used as a line to be connected to a conference server. When there are not sufficient bands in such a line where there is no guarantee for the bands, the communication rate will decrease, and thus there is a problem that even when a user takes part in a conference, the telephone conference cannot be conducted with service quality satisfactory enough for the user. If there is no available band in the line, another problem arises in which a user cannot participate in a conference in the first place.

As a related technique, there has been means for enabling a wireless terminal to change its connection destination from a first access point where no band is available to a second access point where there is an available band(s).

For example, Patent Literature 1 discloses a wireless LAN terminal that receives and displays remaining band information transmitted from a plurality of wireless LAN base stations and is connected to a wireless LAN base station selected from among the plurality of wireless LAN base stations based on the displayed remaining band information.

CITATION LIST

Patent Literature

Patent Literature 1: Japanese Unexamined Patent Application Publication No. 2012-205085
Patent Literature 2: Japanese Unexamined Patent Application Publication No. 2002-218522

SUMMARY OF INVENTION

Technical Problem

However, if the second access point is physically distant from the terminal, there has been a problem that speech quality deteriorates. In this case, there has been a problem regarding inconvenience, namely if a user attempts to take part in a conference and fails, and then the user has to use another terminal of a type different from the previously used terminal.

Moreover, for example, the invention according to Patent Literature 1 is an invention that selects one wireless LAN base station from the plurality of wireless LAN base stations, that is, it is an invention that uses only the wireless LAN network as lines to connect a terminal to the base station and does not allow a user of the terminal to select one kind of line from among a plurality of different kinds of lines.

The present invention has been made in light of the above problems, and an object of the present invention is to provide a conference management device, a conference management method, a program for conference management, and a conference management system that display electric field intensity information of respective terminals and available capacity information of respective bands in a plurality of lines for the respective terminals before users using the respective terminals participate in a conference, so that the user can select one terminal from among the plurality of terminals based on the display.

Solution to Problem

A first aspect of the present invention is a conference management system including: a conference management device connected to a plurality of networks; and a plurality of wireless terminals connected to the plurality of networks and to the conference management device via access points corresponding to the plurality of respective networks. Each of the plurality of wireless terminals transmits, to the conference management device, a wireless terminal name of the corresponding wireless terminal, a user name of a user who uses the corresponding wireless terminal, and electric field intensity information and band information of an access point to which the corresponding wireless terminal belongs, and the conference management device transmits, to one or more wireless terminals corresponding to a predetermined user name, a pair of wireless terminal names corresponding to the predetermined user name and electric field intensity information and band information of access points to which respective wireless terminals belong from among the wireless terminal names and the electric field intensity information and the band information of the access points to which the plurality of respective wireless terminals belong, which have been received from the plurality of wireless terminals, and the one or more wireless terminals corresponding to the predetermined user name display the pair of the wireless terminal names corresponding to the predetermined user name and the electric field intensity information and the band information of the access points to which the respective wireless terminals belong, which have been received from the conference management device.

A second aspect of the present invention is a conference management device used by a conference management system including the conference management device connected to a plurality of networks and a plurality of wireless terminals connected to the plurality of networks and to the conference management device via access points corresponding to the plurality of respective networks. The conference management device includes: reception means for receiving, from the plurality of respective wireless terminals, wireless terminal names, user names, and electric field intensity information and band information of the access points to which the plurality of respective wireless terminals belong; and transmission means for transmitting, to one or more wireless terminals corresponding to a predetermined user name, a pair of wireless terminal names corresponding to the predetermined user name and electric field intensity information and band information of access points to which respective wireless terminals belong from among the wireless terminal names and the electric field intensity information and the band information of the access points to which the plurality of respective wireless terminals belong, which have been received from the plurality of wireless terminals.

A third aspect of the present invention is a wireless terminal used by a conference management system including a conference management device connected to a plurality of networks and a plurality of the wireless terminals connected to the plurality of networks and to the conference management device via access points corresponding to the plurality of respective networks. The wireless terminal includes: transmitting means for transmitting, to the conference management device, a wireless terminal name of the wireless terminal, a user name of a user who uses the wireless terminal, and electric field intensity information and band information of the access network to which the wireless terminal belongs; reception means for receiving, when the user name of the user who uses the wireless terminal is a predetermined user name, a pair of all of wireless terminal names corresponding to the predetermined user name and electric field intensity information and band information of access points to which respective wireless terminals belong from the conference management device; and display means for displaying the pair of the plurality of wireless terminal names corresponding to the predetermined user name and the electric field intensity information and the band information of the access points to which the respective wireless terminals belong, which have been received from the conference management device.

A fourth aspect of the present invention is a conference management method used by a conference management system including a conference management device connected to a plurality of networks and a plurality of wireless terminals connected to the plurality of networks and to the conference management device via access points corresponding to the plurality of respective networks. The conference management method includes: transmitting, from each of the plurality of wireless terminals to the conference management device, a wireless terminal name of the corresponding wireless terminal, a user name of a user who uses the corresponding wireless terminal, and electric field intensity information and band information of an access point to which the corresponding wireless terminal belongs, and transmitting, from the conference management device to one or more wireless terminals corresponding to a predetermined user name, a pair of wireless terminal names corresponding to the predetermined user name and electric field intensity information and band information of access points to which respective wireless terminals belong from among the wireless terminal names and the electric field intensity information and the band information of the access points to which the plurality of respective wireless terminals belong, which have been received from the plurality of wireless terminals; and displaying, by the one or more wireless terminals corresponding to the predetermined user, the pair of the plurality of wireless terminal names corresponding to the predetermined user name and the electric field intensity information and the band information of the access points to which the respective wireless terminals belong, which have been received from the conference management device.

A fifth aspect of the present invention is a program for conference management for causing a computer to function as a conference management device used by a conference management system including the conference management device connected to a plurality of networks and a plurality of wireless terminals connected to the plurality of networks and to the conference management device via access points corresponding to the plurality of respective networks. The program causes the computer to function as: reception means for receiving, from each of the plurality of wireless terminals, a wireless terminal name of the corresponding wireless terminal, a user name of a user who uses the corresponding wireless terminal, and electric field intensity information and band information of an access point to which the corresponding wireless terminal belongs; and transmission means for transmitting, to one or more wireless terminals corresponding to a predetermined user name, a pair of a wireless terminal name, and electric field intensity information and band information of access points to which the wireless terminals belong from among the wireless terminal names and the electric field intensity information and the band information of the access points to which the respective wireless terminals belong, which have been received from the plurality of wireless terminals.

Advantageous Effects of Invention

According to the present invention, a user checks electric field intensity for each of a plurality of wireless terminals and available capacity of bands, so that he or she can select an optimal terminal as a terminal participating in a conference depending on the circumstances to participate in a telephone conference.

BRIEF DESCRIPTION OF DRAWINGS

FIG. 5A is a table showing an example of an electric field intensity and band information table according to the exemplary embodiment of the present invention;

FIG. 5B is a table showing an example of the electric field intensity and band information table according to the exemplary embodiment of the present invention;

FIG. 5C is a table showing an example of the electric field intensity and band information table according to the exemplary embodiment of the present invention;

FIG. 5D is a table showing an example of the electric field intensity and band information table according to the exemplary embodiment of the present invention;

FIG. 7 is a table showing an example of a login information table according to the exemplary embodiment of the present invention;

FIG. 8A is a table showing an example of an access point band information table according to the exemplary embodiment of the present invention;

FIG. 8B is a table showing an example of an access point band information table according to the exemplary embodiment of the present invention; and FIG. 9 is a table showing an example of a terminal speech quality information table according to the exemplary embodiment of the present invention.

DESCRIPTION OF EMBODIMENTS

Hereinafter, exemplary embodiments for carrying out the present invention will be described with reference to the drawings.

[Configuration of Conference Management System]

Figure 1:
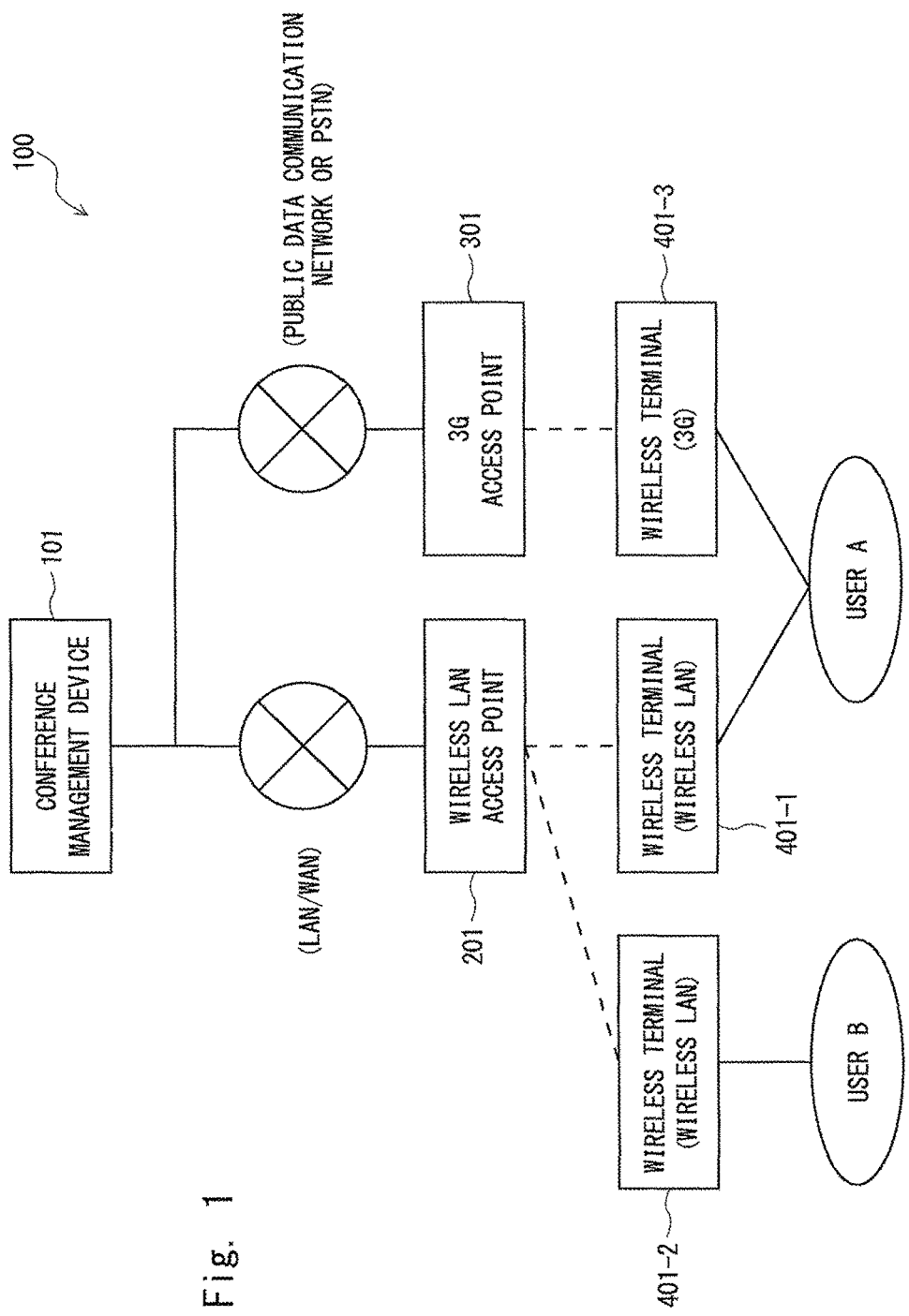
FIG. 1 shows a configuration example of a conference management system according to an exemplary embodiment of the present invention.

FIG. 1 shows a configuration example of a conference management system 100 according to an exemplary embodiment of the present invention. Referring to FIG. 1, the conference management system 100 includes a conference management device 101, wireless terminals for wireless LAN, which access the conference management device 101 via LAN in which the conference management device 101 is located or via WAN including the Internet or an intracompany line (hereinafter may be referred to as "wireless terminals (wireless LAN)" 401-1 and 401-2, a wireless LAN access point 201 that accommodates the wireless terminals (wireless LAN) 401-1 and 401-2, a wireless terminal for 3G 401-3, which accesses the conference management device 101 via a line such as a PSTN (Public Switched Telephone Network) line or a public data communication network (hereinafter may be referred to as a "wireless terminal (3G)"), and a 3G access point 301 that accommodates the wireless terminal (3G) 401-3.

Note that in FIG. 1, although the wireless LAN and 3G are shown as examples of the lines, the exemplary embodiments of the present invention are not limited to this, and instead lines of types other than them, for example, LTE, may be used. Further, although only two types of lines are shown in FIG. 1 for the sake of simplicity, the exemplary embodiments of the present invention are not limited to this, and instead three or more types of lines may be used. Further, although only the wireless terminals (wireless LAN) 401-1 and 401-2 are shown in FIG. 1 as wireless terminals accommodated in the wireless LAN access point 201 for the sake of simplicity, the exemplary embodiments of the present invention are not limited to this, and instead three or more wireless terminals (wireless LAN) may be accommodated therein. Additionally, although only the wireless terminal (3G) 401-3 is shown as the wireless terminal accommodated in the 3G access point 301 for the sake of simplicity, the exemplary embodiments of the present invention are not limited to this, and two or more wireless terminals (3G) may be accommodated therein. Further additionally, although only users A and B are shown as users of the wireless terminals for the sake of simplicity, the exemplary embodiments of the present invention are not limited to this, and instead three or more users may exist.

[Configuration of Conference Management Device]

Figure 2:
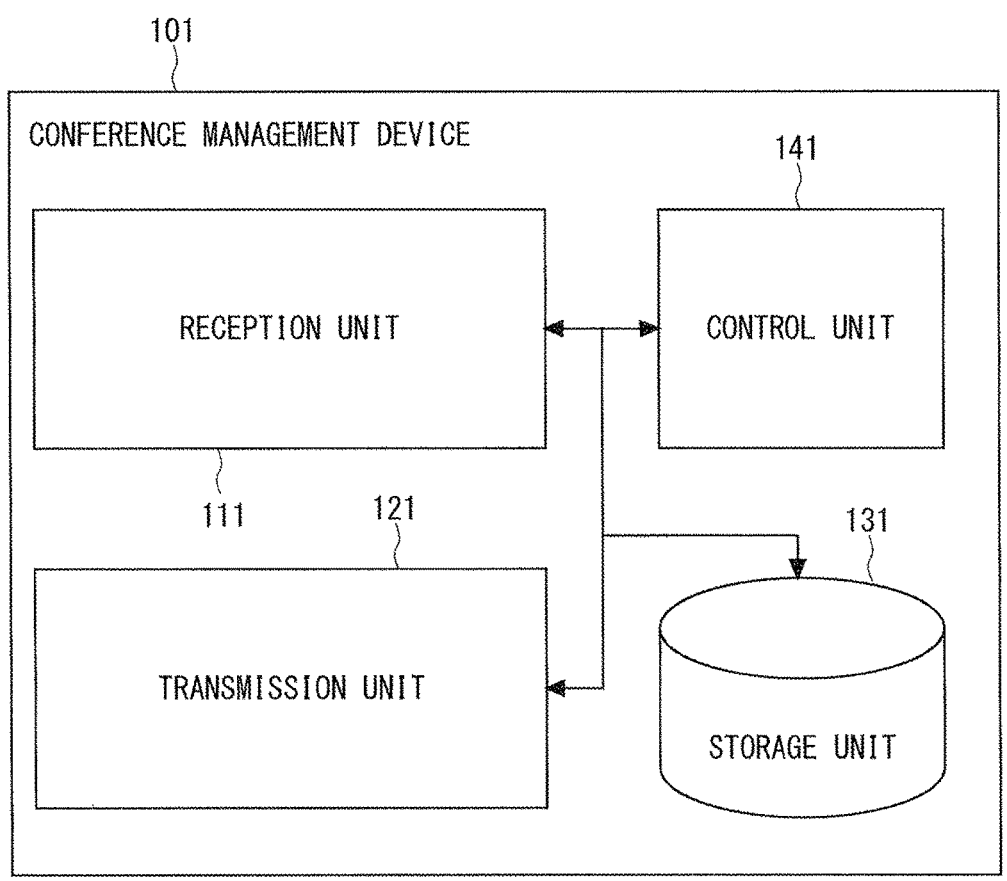
FIG. 2 shows a configuration example of a conference management device used by the conference management system according to the exemplary embodiment of the present invention.

FIG. 2 is a drawing showing a configuration example of the conference management device 101 used by the conference management system 100 according to the exemplary embodiment of the present invention, which is shown in FIG. 1. The conference management device 101 includes a reception unit 111 and a transmission unit 121 that communicate with the wireless terminals (wireless LAN) 401-1 and 401-2 via the wireless LAN access point 201 and with the wireless terminal (3G) 401-3 via the 3G access point 301. In addition, the conference management device 101 includes a storage unit 131 that stores at least a login information table for storing login information of the respective wireless terminals and a terminal speech quality information table for storing user names, terminal names, bands in channels in use, and maximum capacities of the bands in the channels for the respective wireless terminals. The conference management device 101 further includes a control unit 141 that controls the reception unit 111, the transmission unit 121, and the storage unit 131.

[Configuration of Access Point]

Figure 3:
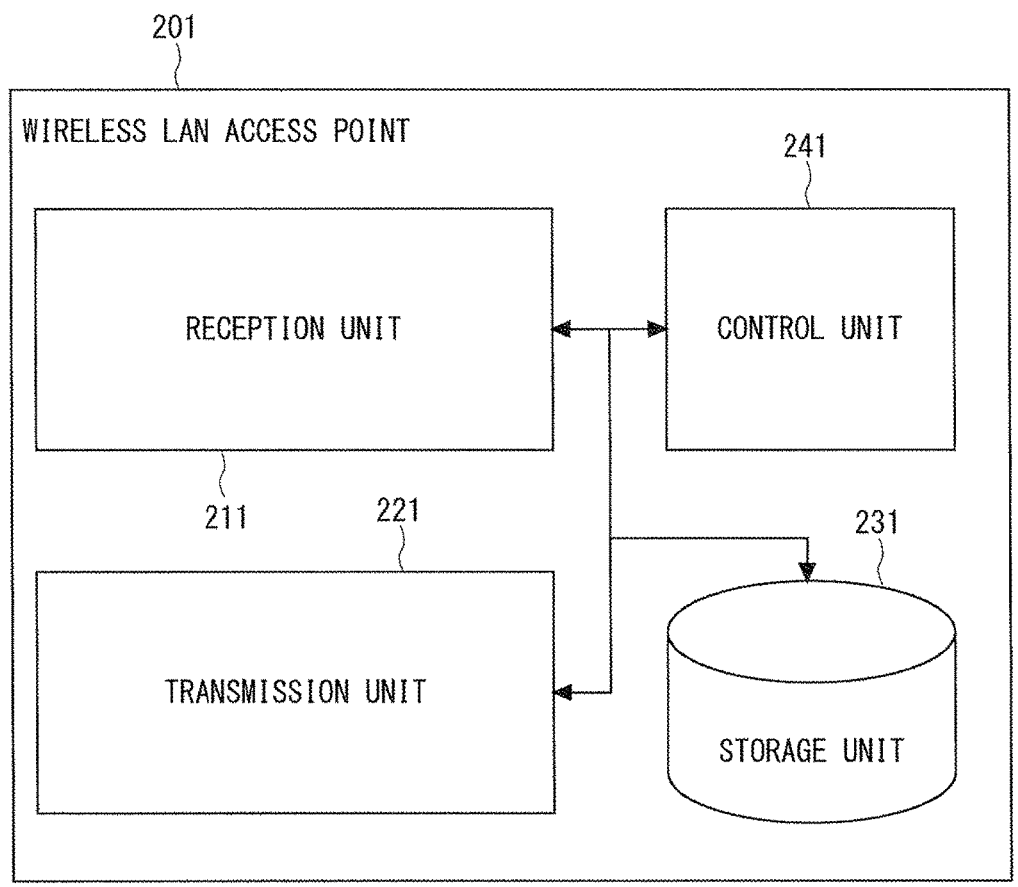
FIG. 3 shows a configuration example of a wireless LAN access point used by the conference management system according to the exemplary embodiment of the present invention.

FIG. 3 is a drawing showing a configuration example of the wireless LAN access point 201 used by the conference management system 100 according to the exemplary embodiment of the present invention, which shown in FIG. 1. The wireless LAN 201 includes a reception unit 211 and a transmission unit 221 that communicate with the conference management device 101 and the wireless terminals (radio LAN) 401-1 and 401-2. The wireless LAN access point 201 further includes a storage unit 231 that stores at least an access point band information table for storing identification information of the wireless LAN access point 201, bands in the channel in use, and maximum capacities of the bands in the channel. The wireless LAN access point 201 further includes a control unit 241 that controls the reception unit 211, the reception unit 221, and the storage unit 231.

The 3G access point 301 used by the conference management system 100 according to the exemplary embodiment of the present invention, which is shown in FIG. 1, has the same configuration as that of the wireless LAN access point 201. The configuration of the 3G access point 301 is not shown. That is, the 3G access point 301 includes a reception unit 311 and a transmission unit 321 that communicate with the conference management device 101 and the wireless terminal (3G) 401-3. The 3G access point 301 further includes a storage unit 331 that stores at least an access point band information table for storing identification information of the 3G access point 301, bands in the channel in use, and maximum capacities of the bands in the channel. The 3G access point 301 further includes a control unit 341 that controls the reception unit 311, the reception unit 321, and the storage unit 331.

[Configuration of Wireless Terminal]

Figure 4:
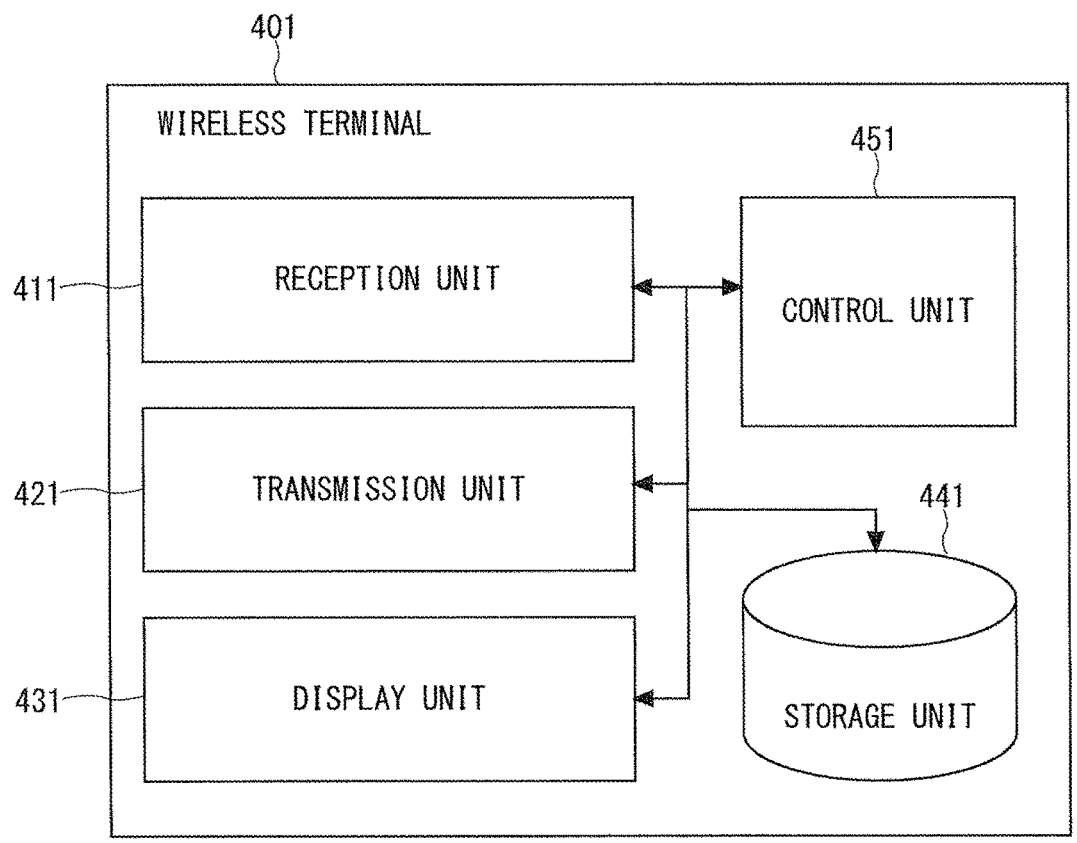
FIG. 4 shows a configuration example of a wireless terminal used by the conference management system according to the exemplary embodiment of the present invention.

FIG. 4 is a drawing showing a configuration example of the wireless terminal 401 (wireless terminals 401-1 to 401-3) used by the conference management system 100 according to the exemplary embodiment of the present invention, which is shown in FIG. 1. The wireless terminal 401 includes a reception unit 441 and a transmission unit 421 that communicate with the conference management device 101 via the wireless LAN access point 201 or the 3G access point 301. The wireless terminal 401 further includes a display unit 431 that displays the electric field intensity and a band information table that stores a terminal name(s) used by a particular user(s), electric field intensity of the respective terminals, and available capacities of the bands in the channel used by the respective terminals, which are received from the conference management device 101. The wireless terminal 401 further includes a storage unit 411 that stores at least the electric field intensity and band information table, user name of a user using the radio terminal 401, and a band information table for storing band information of the respective access points, which is received from the wireless LAN access point 301 or the 3G access point 301. The wireless terminal 401 further includes a control unit 451 that controls the reception unit 411, the transmission unit 421, the display unit 431, and the storage unit 441.

[Outline of Usage]

Suppose that the user A, who is a participant in a telephone conference, is using the wireless terminal (wireless LAN) 401-1 and the wireless terminal (3G) 401-3 simultaneously.

The wireless terminal (wireless LAN) 401-1 belongs to the wireless LAN access point 201 that provides a best effort IP network and can access the conference management device 101 via the IP network.

The wireless terminal (3G) 401-3 belongs to the 3G access point 301 that provides a best effort IP network and can access the conference management device 101 via the IP network.

The user A is summoned to a telephone conference and uses the wireless terminal (wireless LAN) 401-1 to access the conference management device 101. The wireless terminal (wireless LAN) 401-1 and the wireless terminal (3G) 401-3 used by the user A automatically transmit, to the conference management device 101, the current electric field intensity of the respective terminals and band information of the access points to which the terminals belong.

The conference management device 101 transmits the electric field intensity and band information table shown in FIG. 5A, i.e., the electric field intensity information and band information of the wireless terminal (wireless LAN) 401-1 and the wireless terminal (3G) 401-3 to the wireless terminal (wireless LAN) 401-1.

The wireless terminal (wireless LAN) 401-1 displays the electric field intensity and band information table. The wireless terminal (wireless LAN) 401-1 may display the electric field intensity and band information of the respective terminals in an order of the electric field intensity or in an order of the number of available bands.

The user A refers to the table shown in FIG. 5A to compare the electric field intensity and band information of the wireless terminal (wireless LAN) 401-1 and the wireless terminal (3G) 401-3 that are displayed on the wireless terminal (wireless LAN) 401-1. Then the user A may select the wireless terminal (3G) 401-3 because, for example, although there is no available band in the wireless LAN channel of the wireless terminal (wireless LAN) 401-1, instead the band for the wireless terminal (3G) 401-3 is available and then participate in a telephone conference. Alternatively, the user A may select the wireless terminal (wireless LAN) 401-1 because the electric field intensity of the wireless terminal (wireless LAN) 401-1 is greater than that of the wireless terminal (3G) 401-3 and then participate in a telephone conference.

Alternatively, when the conference management device 101 transmits the electric field intensity and band information table shown in FIG. 5B to the wireless terminal (wireless LAN) 401-1, the user A may select the wireless terminal (3G) 401-3 because both the electric field intensity and the available capacities of the bands in the channel of the wireless terminal (3G) 401-3 are greater than those of the wireless terminal (wireless LAN) 401-1 and then participate in a telephone conference.

In another alternative, when the conference management device 101 transmits the electric field intensity and band information table shown in FIG. 5C to the wireless terminal (wireless LAN) 401-1, the user A may select the wireless terminal (wireless LAN) 401-1 because both the electric field intensity and the available capacities of the bands in the channel of the wireless terminal (wireless LAN) 401-1 are greater than those of the wireless terminal (3G) 401-3 and then participate in a telephone conference.

In still another alternative, when the conference management device 101 transmits the electric field intensity and band information table shown in FIG. 5D to the wireless terminal (wireless LAN) 401-1, the user A may select the wireless terminal (3G) 401-3 because the electric field intensity of the wireless terminal (3G) 401-3 is greater than that of the wireless terminal (wireless LAN) 401-1 and then participate in a telephone conference. Alternatively, the user A may select the wireless terminal (wireless LAN) 401-1 because the available capacities of the bands in the channel of the wireless terminal (wireless LAN) 401-1) are greater than those of the wireless terminal (3G) 401-3 and then participate in a telephone conference.

As described above, the user A can use an optimal wireless terminal to participate in a telephone conference.

Note that in the above-described outline of the usage, an example in which the conference management device 101 transmits the electric field intensity and band information table only to the wireless terminal (wireless LAN) 401-1, and only the wireless terminal (wireless LAN) 401-1 displays the electric field intensity and band information table has been described. However, the exemplary embodiments of the present invention are not limited to this. For example, the conference management device 101 may transmit the electric field intensity and band information tables to the wireless terminal (wireless LAN) 401-1 and the wireless terminal (3G) 401-3, which are used by the user A, and both the wireless terminal (wireless LAN) 401-1 and wireless terminal (3G) 401-3 may display the respective electric field intensity and band information tables.

[Usage Details]

(Convening Telephone Conference)

Figure 6A:
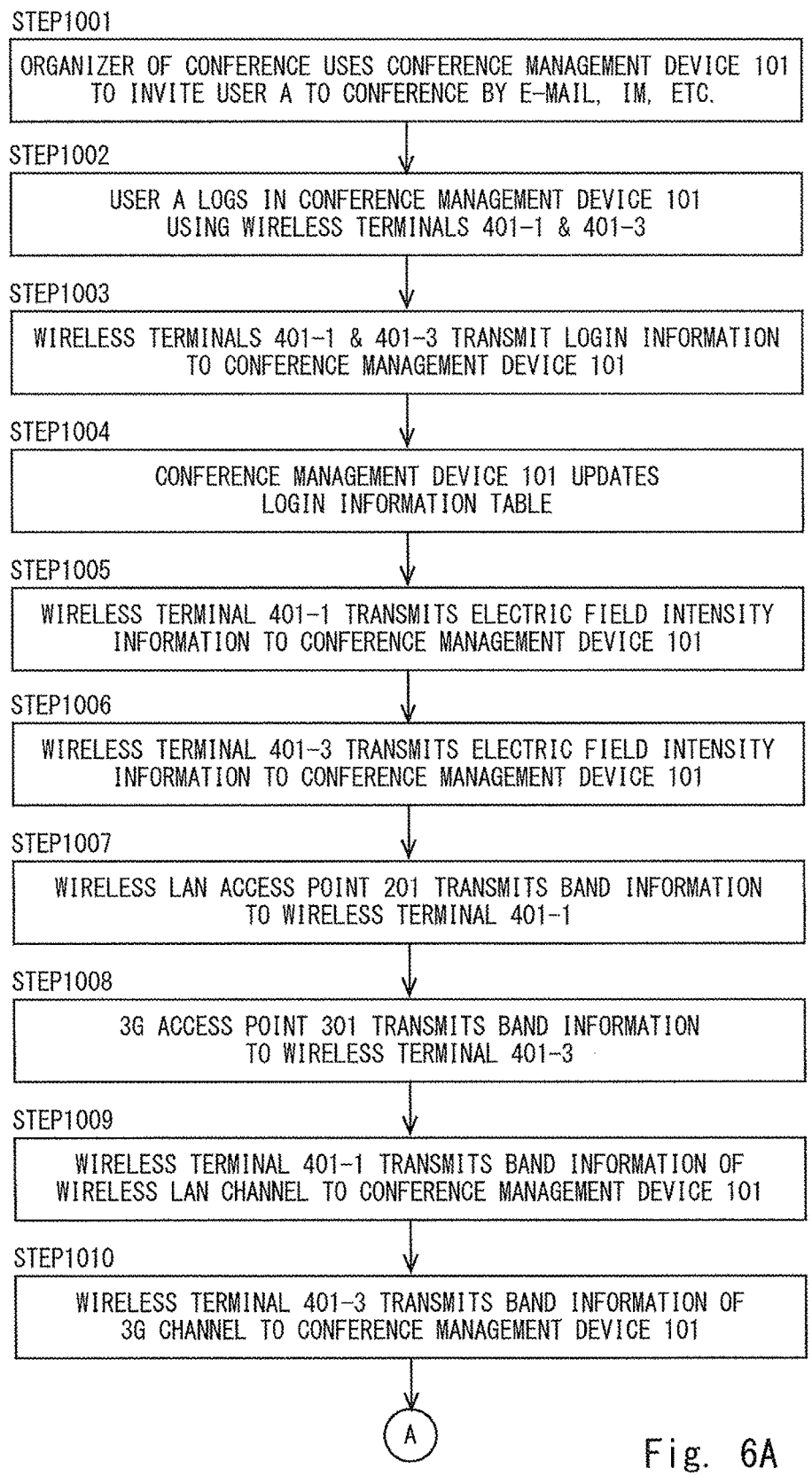
FIG. 6A shows an example of a flowchart of a conference management method according to the exemplary embodiment of the present invention.
Figure 6B:
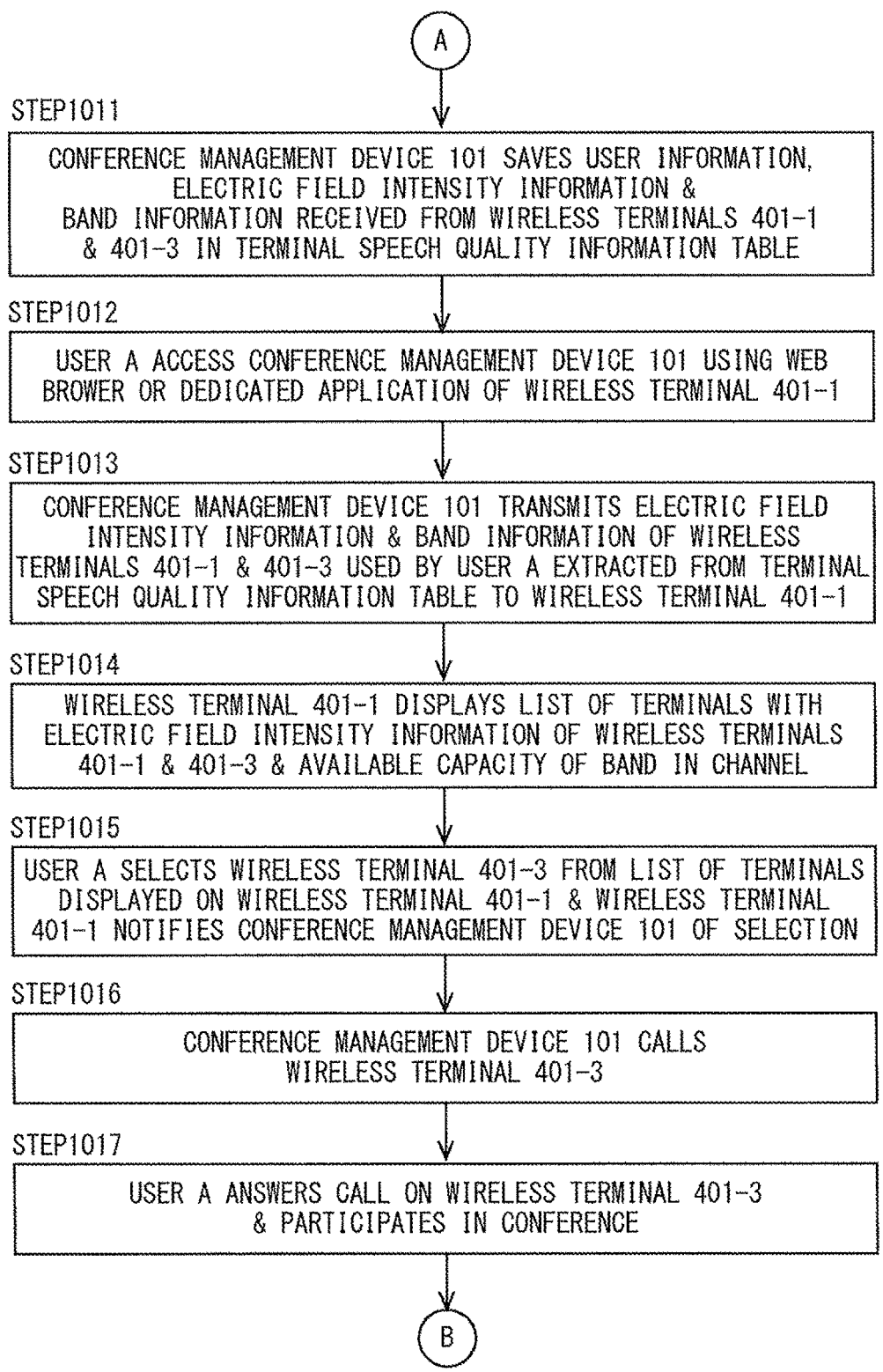
FIG. 6B shows an example of a flowchart of the conference management method according to the exemplary embodiment of the present invention.
Figure 6C:
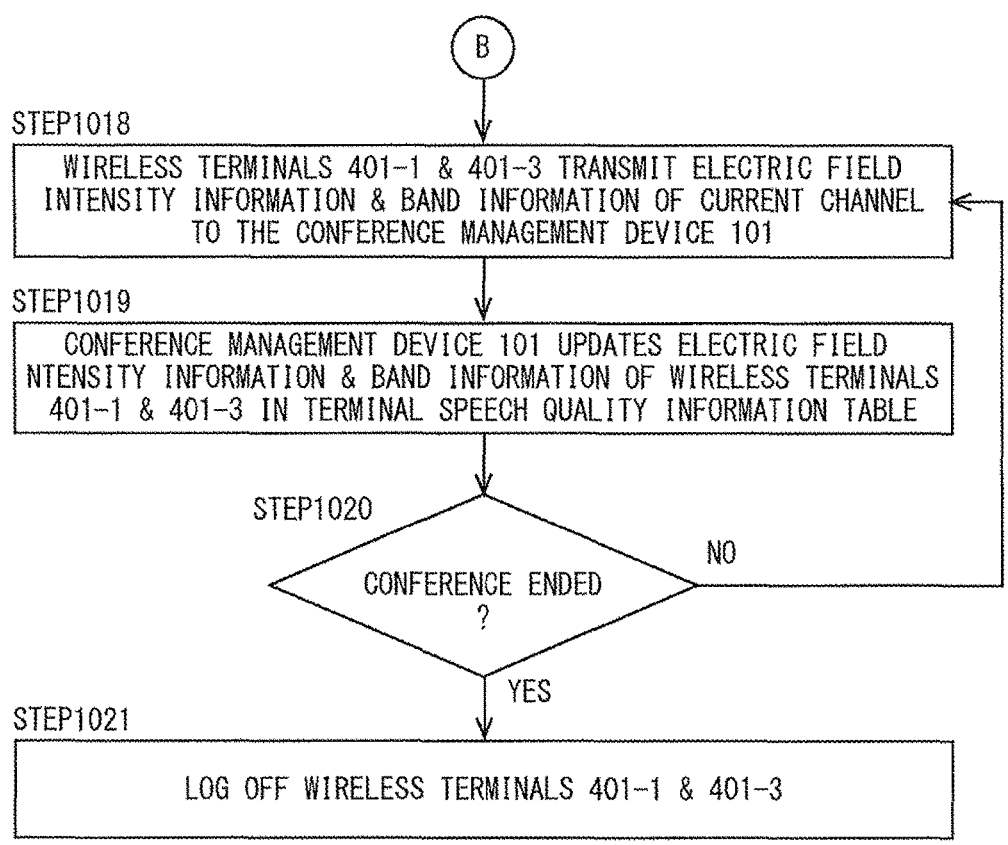
FIG. 6C shows an example of a flowchart of the conference management method according to the exemplary embodiment of the present invention.

An example of the usage will be described in detail with reference to flowcharts of FIGS. 6A to 6C and tables of FIGS. 7 to 9.

Firstly, an organizer of a telephone conference invites participates including the users A and B through the use of the conference management device 101 (Step 1001). At this time, the organizer of the telephone conference uses a communication unit of the conference management device 101 (not shown), for example, means such as an e-mail, an instant message (IM), or the like to notify the participants that the telephone conference will be conducted.

(Logging in Conference Management Device)

At a telephone conference, the user A uses the wireless terminal (wireless LAN) 401-1 and wireless terminal (3G) 401-3 to log in the conference management device 101 (Step 1002).

The wireless terminal (wireless LAN) 401-1 and wireless terminal (3G) 401-3 transmit login information including "user A", which is participant information, and the "wireless terminal 401-1" and "wireless terminal 401-3", which are names of the logged in terminals, to the conference management device 101 (Step 1003).

The conference management device 101 updates the login information table shown in FIG. 7 by adding the "user A", which is the participant information, and the "wireless terminal 401-1" and "wireless terminal 401-3", which are terminal names of the logged in wireless terminals, to enable the conference management device 101 to recognize that the user A uses the wireless terminal (wireless LAN) 401-1 and wireless terminal (3G) 401-3 to have logged therein (Step 1004).

(Notifying Conference System of Communication Status)

The wireless terminal (wireless LAN) 401-1 measures the electric field intensity of the wireless LAN access point 201 to which it currently belongs and transmits the measured electric field intensity to the conference system 101 as the speech quality (Step 1005).

The wireless terminal (3G) 401-3 measures the electric field intensity of the 3G access point 301 to which it currently belongs and transmits the measured electric field intensity to the conference system 101 as the speech quality (Step 1006).

The wireless terminal (wireless LAN) 401-1 makes an inquiry about the usage status of the bands in the wireless LAN channel for a telephone conference to the wireless LAN access point 201. The wireless LAN access point 201 transmits, to the wireless terminal (wireless LAN) 401-1, the identification information of the wireless LAN access point 201, the maximum capacities of the bands in the wireless LAN channel managed by the wireless LAN access point 201, and the bands currently used by all the wireless terminals that belong to the wireless LAN access point 201 in the access point band information table shown in FIG. 8A (Step 1007).

The wireless terminal (3G) 401-3 makes an inquiry about the usage status of the bands in the 3G line to the 3G access point 301 in order to participate in the telephone conference. The 3G access point 301 transmits, to the radio terminal (3G) 401-3, the identification information of the 3G access point 301, the maximum capacities of the bands in the 3G channel managed by the 3G access point 310, and the bands currently used by all the wireless terminals that belong to the 3G access point 301 in the access point band information table shown in FIG. 8B (Step 1008).

The wireless terminal (wireless LAN) 401-1 transmits the band information of the wireless LAN channel, which has been transmitted from the wireless LAN access point 201, to the conference management device 101 (Step 1009).

The wireless terminal (3G) 401-3 transmits the band information of the 3G channel, which has been transmitted from the 3G access point 301, to the conference management device 101 (Step 1010).

The conference management device 101 saves the "user A", which is the information about the participant using the wireless terminal (wireless LAN) 401-1 and wireless terminal (3G) 401-3, the identification information of the respective terminals, the electric field intensity information, and the band information of the channel, which have been transmitted by the wireless terminal (wireless LAN) 401-1 and wireless terminal (3G) 401-3, in the terminal telephone speech quality information table shown in FIG. 9 (Step 1011).

(Displaying a List of Terminals Participating in Telephone Conference)

The user A uses the wireless terminal (wireless LAN) 401-1 to access the conference management device 101 by means of a Web browser or a dedicated application including, for example, a display screen (Step 1012).

The conference management device 101 extracts, from the terminal speech quality information shown in FIG. 9, the electric field intensity information and band information of the wireless terminal (wireless LAN) 401-1 and wireless terminal (3G) 401-3, which are used by the user A to log in the conference management device 101, and transmits the electric field intensity and band information table shown in FIG. 5A to the wireless terminal (wireless LAN) 401-1 (Step 1013).

The wireless terminal (wireless LAN) 401-1 displays, on the screen of the wireless terminal (wireless LAN) 401-1, a list of terminals with the electric field intensity information of the wireless terminal (wireless LAN) 401-1 and wireless terminal (3G) 401-3, which has been received from the conference management device 101, and available capacities of the bands calculated by subtracting the bands currently in use from the maximum capacities of the bands in the channel (Step 1014). The list of the terminals provides choices for the user A to select a terminal therefrom to participate in a conference, and the wireless terminals are displayed in the order of the number of available bands or the electric field intensity of the wireless terminals.

The electric field intensity information displayed in this example is the electric field intensity information measured immediately after log in, as described earlier. The band information displayed in this example is the band information at the time when inquiries about the usage statuses of the bands are made to the respective access points immediately after log in, as described earlier.

(Participating in Telephone Conference)

The user A checks the electric field intensity information and the band information of the wireless terminal (wireless LAN) 401-1 and wireless terminal (3G) 401-3, which are displayed on the display of the wireless terminal (wireless LAN) 401-1. At this time, for example, if there is no available wireless LAN channel in the wireless LAN access point 301 to which the wireless terminal (wireless LAN) 401-1 currently belongs, the user A stops trying to participate in the telephone conference by using the wireless terminal (wireless LAN) 401-1 and instead selects the wireless terminal (3G) 401-3 from the terminals displayed on the screen of the wireless terminal (wireless LAN) 401-1 in order to participate in the telephone conference by using the wireless terminal (3G) 401-3. The wireless terminal (wireless LAN) 401-1 then notifies the conference management device 101 that the user A will use the wireless terminal (3G) 401-3 to participate in the telephone conference (Step 1015).

The conference management device 101 calls the wireless terminal (3G) 401-3 via the PSTN line (Step 1016).

The user A answers the call on the wireless terminal (3G) 401-3 and participates in the conference (Step 1017). Alternatively, the conference management device 101 may transmit a request for urging the wireless terminal (3G) 401-3 to participate in the conference via a public data communication network such as the Internet, the wireless terminal (3G) 401-3 may display the request on the screen, the user A may select the wireless terminal (3G) 401-3 to participate in the telephone conference, and then the user A may participate in the conference. Note that when the wireless terminal (3G) 401-3 participates in a telephone conference, the wireless terminal (3G) 401-3 transmits the band information of the band, which the wireless terminal (3G) 401-3 plans to use in the telephone conference, to the 3G access point 301 and makes an inquiry about whether or not the band can be used. If there is an available band(s) in the 3G channel, the 3G access point 301 notifies the wireless terminal (3G) 401-3 that the channel is available.

When the user B, who uses the wireless terminal (wireless LAN) 401-2 that belongs to the wireless LAN access point 201, starts a conference, the user B checks on the display of the wireless terminal (wireless LAN) 401-2, which displays the band information received from the wireless LAN access point 201, as to whether or not there is any available band in the wireless LAN channel. If the user B determines that there is no available band in the wireless LAN channel on the screen of the wireless terminal (wireless LAN) 401-2, the user B can, for example, prepare another wireless terminal or wired terminal.

(Updating Electric Field Intensity Information and Band Information)

During a conference, at a predetermined point, the wireless terminal (wireless LAN) 401-1 and wireless terminal (3G) 401-3 transmit the electric field intensity information and the access point band information, which are current numbers of bands in use in the channels and maximum band capacities in the channels for the wireless LAN access point 201 and 3G access point 301, to the conference management device 101 (Step 1018).

The conference management device 101 updates the electric field intensity information and band information of a record associated with the user A in the terminal telephone speech quality information table (Step 1019).

The updating of the electric field intensity information and band information is repeated multiple times until the conference ends (No in Step 1020).

Regarding the above term "predetermined point", when the wireless terminal (wireless LAN) 401-1 and wireless terminal (3G) 401-3 are handed over between the access points because, for example, they move, and/or when a certain period of time has passed from the previous transmission, the wireless terminal (wireless LAN) 401-1 and wireless terminal (3G) 401-3 transmit the electric field intensity information and band information of the access points to which the wireless terminals belong, and then the conference system 101 updates the record associated with the user A in the terminal speech quality information table.

After the conference ends (Yes in Step 1020), the user A manually logs off the wireless terminal (wireless LAN) 401-1 and wireless terminal (3G) 401-3.

Although only the above example of the usage in which the user A selects the wireless terminal (3G) 401-3 from the list of terminals displayed on the wireless terminal (wireless LAN) 401-1 has been described for the sake of simplicity, the user A may select the wireless terminal (wireless LAN) 401-1 depending on the circumstances.

[Other Embodiments]

In the above example of the usage, although the exemplary embodiment in which the list of terminals is displayed only on the wireless terminal (wireless LAN) 401-1 has been described for the sake of simplicity, the exemplary embodiments of the present invention are not limited to this, and instead the list of terminals may be displayed only on the wireless terminal (3G) 401-3. Alternatively, the list of terminals may be displayed on both the wireless terminal (wireless LAN) 401-1 and wireless terminal (3G) 401-3. When the list of terminals is displayed on the wireless terminal 401-3, the user A may select a wireless terminal to participate in a conference from the wireless terminal (3G) 401-3.

Further, the above example of the usage in which the band information of the wireless LAN access point 201 and 3G access point 301 is transmitted to the wireless terminal (wireless LAN) 401-1 and wireless terminal (3G) 401-3, respectively, and the wireless terminal (wireless LAN) 401-1 and wireless terminal (3G) 401-3 transmit the received information to the conference management device 101 via the respective access points has been described. However, the exemplary embodiments of the present invention are not limited to this, and instead the wireless LAN access point 201 and 3G access point 301 may directly transmit the band information to the conference management device 101.

Further, although the above example of usage in which the user A manually logs off the wireless terminals after the conference ends has been described, the exemplary embodiments of the present invention are not limited to this, and instead the user A may automatically log off the wireless terminals at the same time as the conference ends. Alternatively, the user A may automatically log off the wireless terminal (wireless LAN) 401-1 in response to participating in a conference by answering an incoming call or making a call by the wireless terminal (3G) 401-3. Note that in this case, the updating of the electric field intensity information and band information during a conference is made only with regard to a record concerning the wireless terminal (3G) 401-3.

Furthermore, in the above exemplary embodiments, although the exemplary embodiment in which the user A uses the wireless terminal (3G) 401-3 when there are few or no available bands in the wireless LAN channel of the wireless LAN access point 201, the exemplary embodiments of the present invention are not limited to this. For example, the wireless terminal (wireless LAN) 401-1 may roam another neighboring wireless LAN access point that differs from the wireless LAN access point 201 and is connected via WAN such as the Internet or a dedicated line and then participate in a conference.

Moreover, although in the above exemplary embodiments it has been described that the conferences are conducted through telephone calls, i.e., audio, the exemplary embodiments of the present invention are not limited to this. For example, the conference management device 101 may transmit videos and the like together with audio to the terminals of participants during a conference.

According to the present invention, even when a plurality of wireless terminals to be used by a participant(s) in a telephone conference are using a line that provides a best effort IP network, it is possible to display electric field intensity of the plurality of wireless terminals and available capacity information of a wireless channel before the participant(s) participates in the telephone conference to enable the participant(s) to select an optimal wireless terminal as a participating terminal(s) in the conference depending on the circumstances.

Although the present invention has been described with reference to the above examples, the present invention is not limited to the above examples. Various modifications and changes, understandable to those skilled in the art, can be made to the configurations and details of the present invention within the scope of the present invention.

Note that the components of the above-described conference management system, conference management device, and wireless terminals can be implemented by hardware, software, or a combination thereof. Moreover, the above-described method of accessing a cache memory performed by the cache memory can be implemented by hardware, software, or a combination thereof. Being implemented by software means that a computer loads a program and executes it or hardware operates in accordance with micro codes, which correspond to a program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the exemplary embodiments disclosed above can be described as, but not limited to, the following supplementary notes.

(Supplementary Note 1)

A conference management system comprising:

a conference management device connected to a plurality of networks; and a plurality of wireless terminals connected to the plurality of networks and to the conference management device via access points corresponding to the plurality of respective networks, wherein each of the plurality of wireless terminals transmits, to the conference management device, a wireless terminal name of the corresponding wireless terminal, a user name of a user who uses the corresponding wireless terminal, and electric field intensity information and band information of an access point to which the corresponding wireless terminal belongs, and the conference management device transmits, to one or more wireless terminals corresponding to a predetermined user name, a pair of wireless terminal names corresponding to the predetermined user name and electric field intensity information and band information of access points to which respective wireless terminals belong from among the wireless terminal names and the electric field intensity information and the band information of the access points to which the plurality of respective wireless terminals belong, which have been received from the plurality of wireless terminals, and the one or more wireless terminals corresponding to the predetermined user name display the pair of the wireless terminal names corresponding to the predetermined user name and the electric field intensity information and the band information of the access points to which the respective wireless terminals belong, which have been received from the conference management device.

(Supplementary Note 2)

The conference management system according to Supplementary note 1, wherein the conference management device transmits, to a plurality of the wireless terminals corresponding to the predetermined user name, the pair of wireless terminal names corresponding to the predetermined user name, and the electric field intensity and the band information of the access points to which the respective wireless terminals belong, and the plurality of wireless terminals corresponding to the predetermined user name display the pair of the plurality of the wireless terminal names corresponding to the predetermined user name and the electric field intensity information and the band information of access points to which the respective wireless terminals belong, which have been received from the conference management device.

(Supplementary Note 3)

The conference management system according to Supplementary note 1 or 2, wherein the plurality of networks comprise a plurality of networks complying with standards that are different from each other.

(Supplementary Note 4)

The conference management system according to any one of Supplementary notes 1 to 3, wherein the conference management device calls a wireless terminal selected by a user from among the displayed wireless terminal names.

(Supplementary Note 5)

The conference management system according to any one of Supplementary notes 1 to 4, wherein the conference management device transmits a request for urging the wireless terminal selected by the user from among the displayed wireless terminal names to participate in a telephone conference, and the wireless terminal selected by the user displays the request received from the conference management device.

(Supplementary Note 6)

The conference management system according to Supplementary note 4 or 5, wherein at a predetermined point after the wireless terminal selected by the user participates in the conference, the wireless terminal transmits, to the conference management device, the electric field intensity information and the band information of the access point to which the wireless terminal belongs, and the conference management device updates the electric field intensity information and the band information of the access point to which the wireless terminal selected by the user belongs, which are stored in the conference management device.

(Supplementary Note 7)

The conference management system according to Supplementary note 6, wherein the predetermined point includes a point when the wireless terminal selected by the user is handed over.

(Supplementary Note 8)

The conference management system according to Supplementary note 6 or 7, wherein the predetermined point includes a plurality of points at a fixed interval.

(Supplementary Note 9)

A conference management device used by a conference management system comprising the conference management device connected to a plurality of networks and a plurality of wireless terminals connected to the plurality of networks and to the conference management device via access points corresponding to the plurality of respective networks, the conference management device comprising:

reception means for receiving, from the plurality of respective wireless terminals, wireless terminal names, user names, and electric field intensity information and band information of the access points to which the plurality of respective wireless terminals belong; and transmission means for transmitting, to one or more wireless terminals corresponding to a predetermined user name, a pair of wireless terminal names corresponding to the predetermined user name and electric field intensity information and band information of access points to which respective wireless terminals belong from among the wireless terminal names and the electric field intensity information and the band information of the access points to which the plurality of respective wireless terminals belong, which have been received from the plurality of wireless terminals.

(Supplementary Note 10)

The conference management device according to Supplementary note 9, wherein the transmission means transmits, to the plurality of wireless terminals corresponding to the predetermined user name, a pair of the wireless terminal name corresponding to the predetermined user name and the electric field intensity and band information of the access point to which the respective wireless terminals belong.

(Supplementary Note 11)

The conference management device according to Supplementary note 9 or 10, wherein the plurality of networks comprise a plurality of networks complying with standards that are different from each other.

(Supplementary Note 12)

A wireless terminal used by a conference management system comprising a conference management device connected to a plurality of networks and a plurality of the wireless terminals connected to the plurality of networks and to the conference management device via access points corresponding to the plurality of respective networks, the wireless terminal comprising:

transmitting means for transmitting, to the conference management device, a wireless terminal name of the wireless terminal, a user name of a user who uses the wireless terminal, and electric field intensity information and band information of the access network to which the wireless terminal belongs;

reception means for receiving, when the user name of the user who uses the wireless terminal is a predetermined user name, a pair of all of wireless terminal names corresponding to the predetermined user name and electric field intensity information and band information of access points to which respective wireless terminals belong from the conference management device; and display means for displaying the pair of the plurality of wireless terminal names corresponding to the predetermined user name and the electric field intensity information and the band information of the access points to which the respective wireless terminals belong, which have been received from the conference management device.

(Supplementary Note 13)

The wireless terminal according to Supplementary note 12, wherein the plurality of networks comprise a plurality of networks complying with standards that are different from each other.

(Supplementary Note 14)

A conference management method used by a conference management system comprising a conference management device connected to a plurality of networks and a plurality of wireless terminals connected to the plurality of networks and to the conference management device via access points corresponding to the plurality of respective networks, the conference management method comprising:

transmitting, from each of the plurality of wireless terminals to the conference management device, a wireless terminal name of the corresponding wireless terminal, a user name of a user who uses the corresponding wireless terminal, and electric field intensity information and band information of an access point to which the corresponding wireless terminal belongs, and transmitting, from the conference management device to one or more wireless terminals corresponding to a predetermined user name, a pair of wireless terminal names corresponding to the predetermined user name and electric field intensity information and band information of access points to which respective wireless terminals belong from among the wireless terminal names and the electric field intensity information and the band information of the access points to which the plurality of respective wireless terminals belong, which have been received from the plurality of wireless terminals; and displaying, by the one or more wireless terminals corresponding to the predetermined user, the pair of the plurality of wireless terminal names corresponding to the predetermined user name and the electric field intensity information and the band information of the access points to which the respective wireless terminals belong, which have been received from the conference management device.

(Supplementary Note 15)

The conference management method according to Supplementary note 14, wherein the conference management device transmits, to a plurality of the wireless terminals corresponding to the predetermined user name, the pair of wireless terminal names corresponding to the predetermined user name, and the electric field intensity and the band information of the access points to which the respective wireless terminals belong, and the plurality of wireless terminals corresponding to the predetermined user name display the pair of the plurality of the wireless terminal names corresponding to the predetermined user name and the electric field intensity information and the band information of access points to which the respective wireless terminals belong, which have been received from the conference management device.

(Supplementary Note 16)

The conference management method according to Supplementary note 14 or 15, wherein the plurality of networks comprise a plurality of networks complying with standards that are different from each other.

(Supplementary Note 17)

The conference management method according to any one of Supplementary notes 14 to 16, wherein the conference management device calls a wireless terminal selected by a user from among the displayed wireless terminal names.

(Supplementary Note 18)

The conference management method according to any one of Supplementary notes 14 to 17 wherein the conference management device transmits a request for urging the wireless terminal selected by the user from among the displayed wireless terminal names to participate in a telephone conference, and the wireless terminal selected by the user displays the request received from the conference management device.

(Supplementary Note 19)

The conference management method according to Supplementary note 17 or 18, wherein at a predetermined point after the wireless terminal selected by the user participates in the conference, the wireless terminal transmits, to the conference management device, the electric field intensity information and the band information of the access point to which the wireless terminal belongs, and the conference management device updates the electric field intensity information and the band information of the access point to which the wireless terminal selected by the user belongs, which are stored in the conference management device.

(Supplementary Note 20)

The conference management method according to Supplementary note 19, wherein the predetermined point includes a point when the wireless terminal selected by the user is handed over.

(Supplementary Note 21)
The conference management method according to Supplementary note 19 or 20, wherein the predetermined point includes a plurality of points at a fixed interval.

(Supplementary Note 22)
A program for conference management for causing a computer to function as a conference management device used by a conference management system comprising the conference management device connected to a plurality of networks and a plurality of wireless terminals connected to the plurality of networks and to the conference management device via access points corresponding to the plurality of respective networks, the program causing the computer to function as:

reception means for receiving, from each of the plurality of wireless terminals, a wireless terminal name of the corresponding wireless terminal, a user name of a user who uses the corresponding wireless terminal, and electric field intensity information and band information of an access point to which the corresponding wireless terminal belongs; and transmission means for transmitting, to one or more wireless terminals corresponding to a predetermined user name, a pair of a wireless terminal name, and electric field intensity information and band information of access points to which the wireless terminals belong from among the wireless terminal names and the electric field intensity information and the band information of the access points to which the respective wireless terminals belong, which have been received from the plurality of wireless terminals.

(Supplementary Note 23)
The program for conference management according to Supplementary note 22, wherein the transmission means transmits, to the plurality of wireless terminals corresponding to the predetermined user name, a pair of the wireless terminal name corresponding to the predetermined user name and the electric field intensity and band information of the access point to which the respective wireless terminals belong.

(Supplementary Note 24)
The program for conference management according to Supplementary note 22 or 23, wherein the plurality of networks comprise a plurality of networks complying with standards that are different from each other.

(Supplementary Note 25)
A program for communication for causing a computer to function as a wireless terminal used by a conference management system comprising a conference management device connected to a plurality of networks and a plurality of the wireless terminals connected to the plurality of networks and to the conference management device via access points corresponding to the plurality of respective networks, the program causing the computer to function as:

transmitting means for transmitting, to the conference management device, a wireless terminal name of the wireless terminal, a user name of a user who uses the wireless terminal, and electric field intensity information and band information of the access network to which the wireless terminal belongs;

reception means for receiving, when the user name of the user who uses the wireless terminal is a predetermined user name, a pair of all of wireless terminal names corresponding to the predetermined user name and electric field intensity information and band information of access points to which respective wireless terminals belong from the conference management device; and display means for displaying the pair of the plurality of wireless terminal names corresponding to the predetermined user name and the electric field intensity information and the band information of the access points to which the respective wireless terminals belong, which have been received from the conference management device.

(Supplementary Note 26)
The program for communication according to Supplementary note 25, wherein the plurality of networks comprise a plurality of networks complying with standards that are different from each other.

The present application is based on Japanese Patent Application No. 2015-206845 filed on Oct. 21, 2015 with Japan Patent Office, and claims priority rights of the Paris Convention which is based on Japanese Patent Application No. 2015-206845. The entire contents of Japanese Patent Application No. 2015-206845 are hereby incorporated by reference.

Although representative exemplary embodiments of the present invention are described in detail, it should be noted that various changes, substitutions, and alternatives may be available without departing from the spirit of the invention and the scope of the invention defined by the claims. In addition, although the claims may be amended in the course of application thereof, the inventor intends that the equivalent range of the claimed invention should be maintained.

The present invention can be applied to the telephone conference field in which a conference uses a plurality of mobile phones using limited bands. Moreover, the present invention can be applied, not only to the telephone conference field using the mobile phones, to the teleconference field using wireless terminals.

REFERENCE SIGNS LIST

100 CONFERENCE MANAGEMENT SYSTEM
101 CONFERENCE MANAGEMENT DEVICE
111 RECEPTION UNIT
121 TRANSMISSION UNIT
131 STORAGE UNIT
141 CONTROL UNIT
201 WIRELESS LAN ACCESS POINT
211 RECEPTION UNIT
221 TRANSMISSION UNIT
231 STORAGE UNIT
241 CONTROL UNIT
301 3G ACCESS POINT
311 RECEPTION UNIT
321 TRANSMISSION UNIT
331 STORAGE UNIT
341 CONTROL UNIT
401 WIRELESS TERMINAL
401-1 401-2 WIRELESS TERMINAL (WIRELESS LAN)
401-3 WIRELESS TERMINAL (3G)
411 RECEPTION UNIT
421 TRANSMISSION UNIT
431 DISPLAY UNIT
441 STORAGE UNIT
451 CONTROL UNIT

The invention claimed is:
1. A conference management system comprising:
a conference management device connected to a plurality of networks; and
a plurality of wireless terminals connected to the plurality of networks and to the conference management device via access points corresponding to the plurality of respective networks, wherein
each of the plurality of wireless terminals transmits, to the conference management device, a wireless terminal name of the corresponding wireless terminal, a user name of a user who uses the corresponding wireless terminal, and electric field intensity information and band information of an access point to which the corresponding wireless terminal belongs, and the conference management device transmits, to one or more wireless terminals corresponding to a predetermined user name, a pair of wireless terminal names corresponding to the predetermined user name and electric field intensity information and band information of access points to which respective wireless terminals belong from among the wireless terminal names and the electric field intensity information and the band information of the access points to which the plurality of respective wireless terminals belong, which have been received from the plurality of wireless terminals, and the one or more wireless terminals corresponding to the predetermined user name display the pair of the wireless terminal names corresponding to the predetermined user name and the electric field intensity information and the band information of the access points to which the respective wireless terminals belong, which have been received from the conference management device.

2. The conference management system according to claim 1, wherein the conference management device transmits, to a plurality of the wireless terminals corresponding to the predetermined user name, the pair of wireless terminal names corresponding to the predetermined user name, and the electric field intensity and the band information of the access points to which the respective wireless terminals belong, and the plurality of wireless terminals corresponding to the predetermined user name display the pair of the plurality of the wireless terminal names corresponding to the predetermined user name and the electric field intensity information and the band information of access points to which the respective wireless terminals belong, which have been received from the conference management device.

3. The conference management system according to claim 1, wherein the plurality of networks comprise a plurality of networks complying with standards that are different from each other.

4. The conference management system according to claim 1, wherein the conference management device calls a wireless terminal selected by the user from among the displayed wireless terminal names.

5. The conference management system according to claim 4, wherein at a predetermined point after the wireless terminal selected by the user participates in the conference, the wireless terminal transmits, to the conference management device, the electric field intensity information and the band information of the access point to which the wireless terminal belongs, and the conference management device updates the electric field intensity information and the band information of the access point to which the wireless terminal selected by the user belongs, which are stored in the conference management device.

6. The conference management system according to claim 1, wherein the conference management device transmits a request for urging the wireless terminal selected by the user from among the displayed wireless terminal names to participate in a telephone conference, and the wireless terminal selected by the user displays the request received from the conference management device.

7. A conference management device used by a conference management system comprising the conference management device connected to a plurality of networks and a plurality of wireless terminals connected to the plurality of networks and to the conference management device via access points corresponding to the plurality of respective networks, the conference management device comprising:

receiver that receives, from the plurality of respective wireless terminals, wireless terminal names, user names, and electric field intensity information and band information of the access points to which the plurality of respective wireless terminals belong; and transmitter that transmits, to one or more wireless terminals corresponding to a predetermined user name, a pair of wireless terminal names corresponding to the predetermined user name and electric field intensity information and band information of access points to which respective wireless terminals belong from among the wireless terminal names and the electric field intensity information and the band information of the access points to which the plurality of respective wireless terminals belong, which have been received from the plurality of wireless terminals.

8. A conference management method used by a conference management system comprising a conference management device connected to a plurality of networks and a plurality of wireless terminals connected to the plurality of networks and to the conference management device via access points corresponding to the plurality of respective networks, the conference management method comprising:

transmitting, from each of the plurality of wireless terminals to the conference management device, a wireless terminal name of the corresponding wireless terminal, a user name of a user who uses the corresponding wireless terminal, and electric field intensity information and band information of an access point to which the corresponding wireless terminal belongs, and transmitting, from the conference management device to one or more wireless terminals corresponding to a predetermined user name, a pair of wireless terminal names corresponding to the predetermined user name and electric field intensity information and band information of access points to which respective wireless terminals belong from among the wireless terminal names and the electric field intensity information and the band information of the access points to which the plurality of respective wireless terminals belong, which have been received from the plurality of wireless terminals; and displaying, by the one or more wireless terminals corresponding to the predetermined user name, the pair of the plurality of wireless terminal names corresponding to the predetermined user name and the electric field intensity information and the band information of the access points to which the respective wireless terminals belong, which have been received from the conference management device.

* * * * *